(12) United States Patent
de Mersseman et al.

(10) Patent No.: US 12,228,653 B2
(45) Date of Patent: Feb. 18, 2025

(54) INTEGRATING A SENSING SYSTEM INTO HEADLIGHT OPTICS

(71) Applicant: Magna Electronics, LLC, Southfield, MI (US)

(72) Inventors: Bernard de Mersseman, Lowell, MA (US); Peter Hansson, Stockholm (SE)

(73) Assignee: Magna Electronics, LLC, Southfield, MI (US)

(*) Notice: Subject to any disclaimer, the term of this patent is extended or adjusted under 35 U.S.C. 154(b) by 377 days.

(21) Appl. No.: 17/961,649

(22) Filed: Oct. 7, 2022

(65) Prior Publication Data
US 2024/0118425 A1 Apr. 11, 2024

(51) Int. Cl.
| | | |
|---|---|---|
| *G01S 7/48* | (2006.01) | |
| *G01J 5/10* | (2006.01) | |
| *G01S 7/481* | (2006.01) | |
| *G01S 17/931* | (2020.01) | |
| *B60T 7/12* | (2006.01) | |
| *B60W 60/00* | (2020.01) | |

(52) U.S. Cl.
CPC ............... *G01S 17/931* (2020.01); *G01J 5/10* (2013.01); *G01S 7/4808* (2013.01); *G01S 7/4816* (2013.01); *B60T 7/12* (2013.01); *B60W 60/00* (2020.02); *B60W 2420/408* (2024.01)

(58) Field of Classification Search
CPC ............ B60W 2420/408; G01S 7/4808; G01S 17/931; G01S 7/4816
See application file for complete search history.

(56) References Cited

U.S. PATENT DOCUMENTS

| | | |
|---|---|---|
| 1,520,245 A | 12/1924 | Jules |
| 3,712,985 A | 1/1973 | Swarner et al. |
| 3,898,656 A | 8/1975 | Jensen |
| 4,125,864 A | 11/1978 | Aughton |
| 4,184,154 A | 1/1980 | Albanese et al. |

(Continued)

FOREIGN PATENT DOCUMENTS

| | | |
|---|---|---|
| AT | 509180 | 6/2011 |
| AU | 6638286 A | 6/1987 |

(Continued)

OTHER PUBLICATIONS

"A milestone for laswer sensors in self-driving cars," OSRAM Opto Semiconductors, Trade Press, Jul. 2016, 3 pages.

(Continued)

*Primary Examiner* — Joseph L Williams
(74) *Attorney, Agent, or Firm* — Matthew D. Thayne; Thayne and Davis LLC

(57) ABSTRACT

An example system includes an infrared emitter to output infrared light towards a target, where the infrared light reflects from the target to produce reflected infrared light, and a detector to receive the reflected infrared light and to provide a signal based on the reflected infrared light. The system also includes a lighting system that includes a light emitter to output visible light, a mirror configured (i) to allow the visible light to pass through the mirror and to reflect the reflected infrared light onto the detector, or (ii) to allow the reflected infrared light to pass through the mirror and onto the detector and to reflect the visible light, and one or more optical elements configured to affect the visible light and the reflected infrared light.

20 Claims, 10 Drawing Sheets

(56) References Cited

U.S. PATENT DOCUMENTS

| | | |
|---|---|---|
| 4,362,361 A | 12/1982 | Campbell et al. |
| 4,439,766 A | 3/1984 | Kobayashi et al. |
| 4,765,715 A | 8/1988 | Matsudaira et al. |
| 4,957,362 A | 9/1990 | Peterson |
| 5,200,606 A | 4/1993 | Krasutsky et al. |
| 5,210,586 A | 5/1993 | Grage et al. |
| 5,274,379 A | 12/1993 | Carbonneau et al. |
| 5,428,215 A | 6/1995 | Dubois et al. |
| 5,604,695 A | 2/1997 | Cantin et al. |
| 5,793,491 A | 8/1998 | Wangler et al. |
| 5,889,490 A | 3/1999 | Wachter et al. |
| 5,966,226 A | 10/1999 | Gerber |
| 6,078,395 A | 6/2000 | Jourdain et al. |
| 6,122,222 A | 9/2000 | Hossack et al. |
| 6,292,285 B1 | 9/2001 | Wang et al. |
| 6,384,770 B1 | 5/2002 | De Gouy et al. |
| 6,437,854 B2 | 8/2002 | Hahlweg |
| 6,556,282 B2 | 4/2003 | Jamieson et al. |
| 6,559,932 B1 | 5/2003 | Halmos |
| 7,202,941 B2 | 4/2007 | Munro |
| 7,227,116 B2 | 6/2007 | Gleckler |
| 7,272,271 B2 | 9/2007 | Kaplan et al. |
| 7,440,084 B2 | 10/2008 | Kane |
| 7,483,600 B2 | 1/2009 | Achiam et al. |
| 7,489,865 B2 | 2/2009 | Varshneya et al. |
| 7,544,945 B2 | 6/2009 | Tan et al. |
| 7,570,347 B2 | 8/2009 | Ruff et al. |
| 7,675,610 B2 | 3/2010 | Redman et al. |
| 7,832,762 B2 | 11/2010 | Breed |
| 8,044,999 B2 | 10/2011 | Mullen et al. |
| 8,050,863 B2 | 11/2011 | Trepagnier et al. |
| 8,134,637 B2 | 3/2012 | Rossbach et al. |
| 8,223,215 B2 | 7/2012 | Oggier et al. |
| 8,363,511 B2 | 1/2013 | Frank et al. |
| 8,508,723 B2 | 8/2013 | Chang et al. |
| 8,629,975 B1 | 1/2014 | Dierking et al. |
| 8,742,325 B1 | 6/2014 | Droz et al. |
| 8,836,761 B2 | 9/2014 | Wang et al. |
| 8,836,922 B1 | 9/2014 | Pennecot et al. |
| 8,879,050 B2 | 11/2014 | Ko |
| 9,007,569 B2 | 4/2015 | Amzajerdian et al. |
| 9,063,549 B1 | 6/2015 | Pennecot et al. |
| 9,086,273 B1 | 7/2015 | Gruver et al. |
| 9,090,213 B2 | 7/2015 | Lawlor et al. |
| 9,097,646 B1 | 8/2015 | Campbell et al. |
| 9,140,792 B2 | 9/2015 | Zeng et al. |
| 9,157,790 B2 | 10/2015 | Shpunt et al. |
| 9,267,787 B2 | 2/2016 | Shpunt et al. |
| 9,285,477 B1 | 3/2016 | Smith et al. |
| 9,482,412 B2 | 11/2016 | Schwaiger et al. |
| 9,575,162 B2 | 2/2017 | Owechko |
| 9,618,742 B1 | 4/2017 | Droz et al. |
| 9,651,417 B2 | 5/2017 | Shpunt et al. |
| 9,658,322 B2 | 5/2017 | Lewis |
| 9,696,427 B2 | 7/2017 | Wilson et al. |
| 9,711,493 B2 | 7/2017 | Lin |
| 9,753,351 B2 | 9/2017 | Eldada |
| 9,823,351 B2 | 11/2017 | Haslim et al. |
| 9,857,472 B2 | 1/2018 | Mheen et al. |
| 9,869,754 B1 | 1/2018 | Campbell et al. |
| 10,018,725 B2 | 7/2018 | Liu |
| 10,018,726 B2 | 7/2018 | Hall et al. |
| 10,024,655 B2 | 7/2018 | Raguin et al. |
| 10,078,133 B2 | 9/2018 | Dussan |
| 10,088,557 B2 | 10/2018 | Yeun |
| 10,148,060 B2 | 12/2018 | Hong et al. |
| 10,175,360 B2 | 1/2019 | Zweigle et al. |
| 10,183,541 B2 | 1/2019 | Van Den Bossche et al. |
| 10,369,922 B2 | 8/2019 | Nakashima et al. |
| 10,408,924 B2 | 9/2019 | Mheen et al. |
| 10,411,524 B2 | 9/2019 | Widmer et al. |
| 10,416,292 B2 | 9/2019 | De Mersseman et al. |
| 10,473,767 B2 | 11/2019 | Xiang et al. |
| 10,473,784 B2 | 11/2019 | Puglia |
| 10,473,943 B1 | 11/2019 | Hughes |
| 10,551,501 B1 | 2/2020 | Lachapelle |
| 10,557,923 B2 | 2/2020 | Watnik et al. |
| 10,558,044 B2 | 2/2020 | Pan |
| 10,564,268 B2 | 2/2020 | Turbide et al. |
| 10,578,724 B2 | 3/2020 | Droz et al. |
| 10,627,493 B2 | 4/2020 | Morikawa et al. |
| 10,678,117 B2 | 6/2020 | Shin et al. |
| 10,768,346 B2 | 9/2020 | Miner et al. |
| 10,775,508 B1 | 9/2020 | Rezk et al. |
| 10,937,773 B2 | 3/2021 | T'ng et al. |
| 11,326,758 B1 | 5/2022 | de Mersseman |
| 2001/0052872 A1 | 12/2001 | Hahlweg |
| 2003/0043363 A1 | 3/2003 | Jamieson et al. |
| 2004/0028418 A1 | 2/2004 | Kaplan et al. |
| 2004/0031906 A1 | 2/2004 | Gleckler |
| 2004/0135992 A1 | 7/2004 | Munro |
| 2004/0155249 A1 | 8/2004 | Narui et al. |
| 2005/0219506 A1 | 10/2005 | Okuda et al. |
| 2006/0072189 A1 | 4/2006 | Dimarzio et al. |
| 2006/0221250 A1 | 10/2006 | Rossbach et al. |
| 2006/0232052 A1 | 10/2006 | Breed |
| 2006/0239312 A1 | 10/2006 | Kewitsch et al. |
| 2007/0140613 A1 | 6/2007 | Achiam et al. |
| 2007/0181810 A1 | 8/2007 | Tan et al. |
| 2007/0211786 A1 | 9/2007 | Shattil |
| 2007/0219720 A1 | 9/2007 | Trepagnier et al. |
| 2008/0088499 A1 | 4/2008 | Bonthron et al. |
| 2008/0095121 A1 | 4/2008 | Shattil |
| 2008/0100510 A1 | 5/2008 | Bonthron et al. |
| 2008/0219584 A1 | 9/2008 | Mullen et al. |
| 2008/0246944 A1 | 10/2008 | Redman et al. |
| 2009/0002680 A1 | 1/2009 | Ruff et al. |
| 2009/0010644 A1 | 1/2009 | Varshneya et al. |
| 2009/0190007 A1 | 7/2009 | Oggier et al. |
| 2009/0251361 A1 | 10/2009 | Beasley |
| 2010/0027602 A1 | 2/2010 | Abshire et al. |
| 2010/0157280 A1 | 6/2010 | Kusevic et al. |
| 2010/0182874 A1 | 7/2010 | Frank et al. |
| 2012/0075422 A1 | 3/2012 | Wang et al. |
| 2012/0182540 A1 | 7/2012 | Suzuki et al. |
| 2012/0206712 A1 | 8/2012 | Chang et al. |
| 2012/0236379 A1 | 9/2012 | Da Silva et al. |
| 2012/0310516 A1 | 12/2012 | Zeng |
| 2012/0310519 A1 | 12/2012 | Lawlor et al. |
| 2013/0088726 A1 | 4/2013 | Goyal et al. |
| 2013/0093584 A1 | 4/2013 | Schumacher |
| 2013/0120760 A1 | 5/2013 | Raguin et al. |
| 2013/0166113 A1 | 6/2013 | Dakin et al. |
| 2013/0206967 A1 | 8/2013 | Shpunt et al. |
| 2013/0207970 A1 | 8/2013 | Shpunt et al. |
| 2013/0222786 A1 | 8/2013 | Hanson et al. |
| 2013/0250276 A1 | 9/2013 | Chang et al. |
| 2013/0265561 A1 | 10/2013 | Takahira et al. |
| 2014/0009747 A1 | 1/2014 | Suzuki et al. |
| 2014/0036252 A1 | 2/2014 | Amzajerdian et al. |
| 2014/0049609 A1 | 2/2014 | Wilson et al. |
| 2014/0152975 A1 | 6/2014 | Ko |
| 2014/0168631 A1 | 6/2014 | Haslim et al. |
| 2014/0233942 A1 | 8/2014 | Kanter |
| 2014/0313519 A1 | 10/2014 | Shpunt et al. |
| 2015/0009485 A1 | 1/2015 | Mheen et al. |
| 2015/0055117 A1 | 2/2015 | Pennecot et al. |
| 2015/0234308 A1 | 8/2015 | Lim et al. |
| 2015/0260843 A1 | 9/2015 | Lewis |
| 2015/0301162 A1 | 10/2015 | Kim |
| 2015/0371074 A1 | 12/2015 | Lin |
| 2015/0378011 A1 | 12/2015 | Owechko |
| 2016/0047895 A1 | 2/2016 | Dussan |
| 2016/0047896 A1 | 2/2016 | Dussan |
| 2016/0047903 A1 | 2/2016 | Dussan |
| 2016/0138944 A1 | 5/2016 | Lee et al. |
| 2016/0146926 A1* | 5/2016 | Jungwirth ............. G01S 7/4804 356/5.01 |
| 2016/0178749 A1 | 6/2016 | Lin et al. |
| 2016/0200161 A1 | 7/2016 | Van Den Bossche et al. |
| 2016/0245902 A1 | 8/2016 | Watnik et al. |
| 2016/0280229 A1 | 9/2016 | Kasahara |
| 2016/0291160 A1 | 10/2016 | Zweigle et al. |
| 2016/0357187 A1 | 12/2016 | Ansari |

(56) References Cited

U.S. PATENT DOCUMENTS

| | | |
|---|---|---|
| 2016/0363669 A1 | 12/2016 | Liu |
| 2016/0380488 A1 | 12/2016 | Widmer et al. |
| 2017/0023678 A1 | 1/2017 | Pink et al. |
| 2017/0090013 A1 | 3/2017 | Paradie et al. |
| 2017/0102457 A1 | 4/2017 | Li et al. |
| 2017/0199273 A1 | 7/2017 | Morikawa et al. |
| 2017/0219696 A1 | 8/2017 | Hayakawa et al. |
| 2017/0269215 A1 | 9/2017 | Hall et al. |
| 2017/0270381 A1 | 9/2017 | Itoh et al. |
| 2017/0285346 A1 | 10/2017 | Pan |
| 2017/0307736 A1 | 10/2017 | Donovan |
| 2017/0307737 A1 | 10/2017 | Ishikawa et al. |
| 2017/0310948 A1 | 10/2017 | Pei et al. |
| 2017/0329010 A1 | 11/2017 | Warke et al. |
| 2017/0329011 A1 | 11/2017 | Warke et al. |
| 2018/0052378 A1 | 2/2018 | Shin et al. |
| 2018/0113193 A1 | 4/2018 | Huemer et al. |
| 2018/0128903 A1 | 5/2018 | Chang |
| 2018/0136328 A1 | 5/2018 | Moss |
| 2018/0143309 A1 | 5/2018 | Pennecot et al. |
| 2018/0180718 A1 | 6/2018 | Lin |
| 2018/0224529 A1 | 8/2018 | Wolf et al. |
| 2018/0241477 A1 | 8/2018 | Turbide et al. |
| 2018/0275249 A1 | 9/2018 | Campbell et al. |
| 2018/0275275 A1 | 9/2018 | Lundquist |
| 2018/0284237 A1 | 10/2018 | Campbell et al. |
| 2018/0284282 A1 | 10/2018 | Hong et al. |
| 2018/0284286 A1 | 10/2018 | Eichenholz et al. |
| 2018/0286909 A1 | 10/2018 | Eichenholz et al. |
| 2018/0306913 A1 | 10/2018 | Bartels |
| 2018/0341009 A1 | 11/2018 | Niclass et al. |
| 2018/0364334 A1 | 12/2018 | Xiang et al. |
| 2018/0372870 A1 | 12/2018 | Puglia |
| 2019/0018143 A1 | 1/2019 | Thayer et al. |
| 2019/0101644 A1 | 4/2019 | De Mersseman et al. |
| 2019/0113200 A1 | 4/2019 | Murakami |
| 2019/0123508 A1 | 4/2019 | Hong et al. |
| 2019/0129009 A1 | 5/2019 | Eichenholz et al. |
| 2019/0139951 A1 | 5/2019 | T'ng et al. |
| 2019/0146060 A1 | 5/2019 | Qiu et al. |
| 2019/0195990 A1 | 6/2019 | Shand |
| 2019/0221988 A1 | 7/2019 | Villeneuve et al. |
| 2019/0235064 A1 | 8/2019 | Droz et al. |
| 2019/0242978 A1 | 8/2019 | Weed et al. |
| 2019/0265336 A1 | 8/2019 | Zhang et al. |
| 2019/0310351 A1 | 10/2019 | Hughes et al. |
| 2020/0081129 A1 | 3/2020 | De Mersseman et al. |
| 2020/0088847 A1 | 3/2020 | De Mersseman et al. |
| 2020/0249354 A1 | 8/2020 | Yeruhami et al. |
| 2020/0284906 A1 | 9/2020 | Eichenholz et al. |
| 2020/0341120 A1 | 10/2020 | Ahn et al. |
| 2020/0341121 A1 | 10/2020 | Ahn et al. |
| 2021/0018602 A1 | 1/2021 | De Mersseman et al. |
| 2021/0190919 A1 | 6/2021 | de Mersseman |
| 2022/0146817 A1 | 5/2022 | Erdl et al. |
| 2022/0333757 A1 | 10/2022 | Li et al. |
| 2022/0403998 A1 | 12/2022 | de Mersseman et al. |

FOREIGN PATENT DOCUMENTS

| | | |
|---|---|---|
| CN | 102508258 | 6/2012 |
| DE | 19731754 | 2/1999 |
| DE | 19757840 | 9/1999 |
| DE | 102004033944 | 2/2006 |
| DE | 102006031114 | 1/2008 |
| DE | 102008045387 | 3/2010 |
| DE | 102014218957 | 3/2016 |
| DE | 102015217908 | 3/2017 |
| DE | 102015224692 | 6/2017 |
| DE | 102016201606 | 8/2017 |
| EP | 0112188 | 6/1984 |
| EP | 0578129 | 1/1994 |
| EP | 2124069 | 11/2009 |
| EP | 2696166 | 2/2014 |
| EP | 2824418 | 1/2015 |
| EP | 3147685 | 3/2017 |
| EP | 3203259 | 8/2017 |
| EP | 3457080 | 3/2019 |
| IT | 201800001765 | 7/2019 |
| JP | 2002148556 | 5/2002 |
| JP | 2018041723 | 3/2018 |
| KR | 20190105889 | 9/2019 |
| WO | 1994019705 | 9/1994 |
| WO | 03009048 | 1/2003 |
| WO | 2008/008970 | 1/2008 |
| WO | 2015/014556 | 2/2015 |
| WO | 2016072483 | 5/2016 |
| WO | 2016/097409 | 6/2016 |
| WO | 2016204138 | 12/2016 |
| WO | 2018229131 | 12/2018 |
| WO | 2018229131 A1 | 12/2018 |
| WO | 2019050643 | 3/2019 |
| WO | 2019099166 | 5/2019 |
| WO | 2020243038 | 12/2020 |
| WO | 2020243038 A1 | 12/2020 |

OTHER PUBLICATIONS

"Advanced Scientific Concepts," http://www.advancedscientific-concepts.com/products/overview.html, 2015, 4 pages.

"Cameras," Continental Automotive, https://www.continental-automotive.com/en-gl/Passenger-Cars/Chassis-Safety/Advanced-Driver-Assistance-Systems/Cameras, 2017, 2 pages.

"Hi-Res 3D Flash LIDAR will supplement Continental's existing portfolio for automated driving," Continental AG, Mar. 2016, 2 pages.

"Multi Function Camera with Lidar," Continental Automotive, https://www.continental-automotive.com/en-gl/Passenger-Cars/Chassis-Safety/Advanced-Driver-Assistance-Systems/Cameras/Multi-Function-Camera-with-Lidar, 2017, 2 pages.

Campbell et al., "Advanced sine wave modulation of continuous wave laser system for atmospheric CO2 differential absorption measurements," NASA Langley Research Center; 32 pages.

Church et al., "Evaluation of a steerable 3D laser scanner using a double Risley prism pair," SPIE Paper, 9 pages.

Hewlett-Packard Application Note 77-4, "Swept-Frequency Group Delay Measurements," Hewlett-Packard Co., Sep. 1968, 7 pages.

Journet & Bazin, "A Low-Cost Laser Range Finder Based on an FMCW-Like Method," IEEE Transactions on Instrumentation and Measurement, vol. 49, No. 4, Aug. 2000, 4 pages.

Kahn, "Modulation and Detection Techniques for Optical Communication Systems," OSA/COTA, 2006, 3 pages.

Kasturi et al., "UAV-Borne LiDAR with MEMS Mirror Based Scanning Capability," SPIE Defense and Commercial Sensing Conference, Apr. 2016, 10 pages.

Kravitz et al., "High-Resolution Low-Sidelobe Laser Ranging Based on Incoherent Pulse Compression," IEEE Photonics Technology Letters, vol. 24, No. 23, Dec. 2012, 3 pages.

Levanon et al., "Non-coherent pulse compression—aperiodic and periodic waveforms," IET Radar Sonar Navig., Jun. 2015, 9 pages.

Li et al., "Investigation of beam steering performances in rotation Risley-prism scanner," OSA, Jun. 2016, 11 pages.

Li, "Time-of-Flight Camera—An Introduction," Technical White Paper, SLOA190B, May 2014, 10 pages.

Luhmann, "A historical review on panorama photogrammetry," University of Applied Sciences, Jul. 2008, 9 pages.

Niclass et al., "Development of Automotive LIDAR," Electronics and Communications in Japan, vol. 98, No. 5, 2015, pp. 1-6.

Peer & Levanon, "Compression Waveforms for Non-Coherent Radar," Compression Waveforms for Non-Coherent Radar, Tel Aviv University; 6 pages.

Pierrottet et al., "Linear FMCW Laser Radar for Precision Range and Vector Velocity Measurements," Coherent Applications Inc. & NASA Langley Research Center, 9 pages.

Simpson et al., "Intensity-modulated, stepped frequency cw lidar for distributed aerosol an dhard target measurements," Applied Optics, vol. 44, No. 33, Nov. 2005, 8 pages.

Skolnik, "Introduction to Radar Systems," McGraw-Hill Higher Education, 2001, 6 pages.

(56) References Cited

OTHER PUBLICATIONS

Su et al., "2-D FFT and Time-Frequency Analysis Techniques for Multi-Target Recognition of FMCW Radar Signal," Proceedings of the Asia-Pacific Microwave Conference, 2011, 4 pages.
THORLABS Application Note, Risley Prism Scanner; 33 pages.
Wang et al., "Range-Doppler image processing in linear FMCW radar and FPGA based real-time implementation," Journal of Communication and Computer, vol. 6, No. 4, Apr. 2009, 5 pages.
Wien, "The Geometry of Airborne Laser Scanning in a Kinematical Framework," Vienna University of Technology, Oct. 2016, 69 pages.
Winkler, "Range Doppler Detection for automotive FMCW Radars," Proceedings of the 4th European Radar Conference, Oct. 2007, 4 pages.
Wojtkiewicz et al., "Two-dimensional signal processing in FMCW radars," Instytut Podstaw Elektroniki, 6 pages.
Invitation to Pay Additional Fees and, Where Applicable, Protest Fee issued in International Application No. PCT/US2018/052849 on Mar. 8, 2019.
International Search Report and Written Opinion issued in International Application No. PCT/US2018/052849 on May 6, 2019.
International Search Report and Written Opinion issued in International Application No. PCT/US2018/057676 on Jan. 23, 2019.
International Search Report and Written Opinion issued in International Application No. PCT/US2019/046800 on Nov. 25, 2019.
International Search Report and Written Opinion issued in International Application No. PCT/US2020/039760 on Sep. 18, 2020.
International Search Report and Written Opinion issued in International Application No. PCT/US2020/064474 on Apr. 1, 2021.
International Search Report and Written Opinion issued in International Application No. PCT/US2017/033263 on Aug. 29, 2017.
International Search Report and Written Opinion issued in International Application No. PCT/US2017/033265 on Sep. 1, 2017.
International Search Report and Written Opinion issued in International Application No. PCT/US2017/033271 on Sep. 1, 2017.
International Search Report and Written Opinion issued in International Application No. PCT/US2018/048869 on Nov. 8, 2018.
International Search Report and Written Opinion issued in International Application No. PCT/US2018/049038 on Dec. 12, 2018.
International Search Report and Written Opinion issued in International Application No. PCT/US2018/051281 on Nov. 22, 2018.
International Search Report and Written Opinion issued in International Application No. PCT/US2018/052837 on Jan. 24, 2019.
International Search Report and Written Opinion issued in International Application No. PCT/US2018/054992 on Dec. 11, 2018.
International Search Report and Written Opinion issued in International Application No. PCT/US2018/057727 on Jan. 28, 2019.
International Search Report and Written Opinion issued in International Application No. PCT/US2023/034129 on Jan. 3, 2024.
International Search Report and Written Opinion issued in International Application No. PCT/US2023/034131 on Dec. 21, 2023.

* cited by examiner

INTEGRATING A SENSING SYSTEM INTO HEADLIGHT OPTICS

TECHNICAL FIELD

This specification describes examples of techniques for integrating a sensing system into headlight optics.

BACKGROUND

A vehicle, such as an automobile, includes an illumination system. A headlight, for example, is located on the front of the vehicle and illuminates a path in front the vehicle, at least partly. The vehicle may also include a sensor on a front of the vehicle to sense objects in the vehicle's path or otherwise in front of the vehicle.

SUMMARY

An example system includes an infrared emitter to output infrared light towards a target, where the infrared light reflects from the target to produce reflected infrared light, and a detector to receive the reflected infrared light and to provide a signal based on the reflected infrared light. The system also includes a lighting system that includes a light emitter to output visible light, a mirror configured (i) to allow the visible light to pass through the mirror and to reflect the reflected infrared light onto the detector, or (ii) to allow the reflected infrared light to pass through the mirror and onto the detector and to reflect the visible light, and one or more optical elements configured to affect the visible light and the reflected infrared light. The mirror is between the light emitter and the one or more optical elements or the mirror is between the detector and the one or more optical elements. The example system may include one or more of the following features, either alone or in combination.

The lighting system may include a headlight of a vehicle. The detector may include a silicon photomultiplier (SiPM) sensor that is responsive to infrared wavelengths of light. The infrared emitter may include a near infrared (NIR) laser emitter. The infrared light may include laser light. The mirror may include a dielectric mirror having a dichroic filter to allow the visible light to pass and to reflect the infrared light. The infrared emitter and the detector may be components of a light detection and ranging (LIDAR) system for a vehicle. The LIDAR system may be configured for use in at least one of: automatic emergency braking for the vehicle, forward sensing for the vehicle, or automated driving for the vehicle.

Along a first direction of an optical path containing the one or more optical elements, the one or more optical elements may direct the visible light away from the light emitter. Along a second direction of the optical path, the one or more optical elements may direct the reflected infrared light towards the mirror. Along the first direction of the optical path, the one or more optical elements may direct the visible light. Along the second direction of the optical path, the one or more optical elements may at least partially focus the reflected infrared light. In at least one dimension, at least one of the optical elements may have a dimension that is at least ten times greater in size than a dimension of optics in the infrared emitter.

The detector may include cells that are addressable for operation. The cells may be addressable in sequence by the reflected infrared light to produce a scan of a field of view in front of the infrared emitter. The one or more optical elements may include at least one convex lens. The one or more optical elements may include at least one concave-convex lens. The one or more optical elements may include at least one telecentric stop. The light emitter may include a light-emitting diode matrix array configured to project the visible light toward the mirror.

An example method of scanning a target includes the following operations: outputting infrared light toward the target; receiving reflected infrared light from the target via first optics that are also configured to output visible light toward the target, where the first optics are physically separate from second optics used to output the infrared light toward the target; directing, via the first optics, the reflected infrared light toward a dielectric mirror comprising a dichroic filter configured (i) to reflect infrared light and to allow the visible light to pass through the dielectric mirror, or (ii) to reflect the visible light and to allow the infrared light to pass through the dielectric mirror; and receiving, at a detector, the reflected infrared light via (e.g., by way of or from) the dielectric mirror, where the detector provides one or more signals based on the reflected infrared light. The example method may include one or more of the following features, either alone or in combination.

Along a first direction of an optical path containing the optics, the optics may direct the visible light away from a light emitter. Along a second direction of the optical path, the optics may direct the reflected infrared light towards the dielectric mirror. Along the first direction of the optical path, the optics may direct the visible light. Along the second direction of the optical path, the optics may direct the reflected infrared light. In at least one dimension, the first optics are at least ten times greater in size than the second optics. The method may performed by a light detection and ranging (LIDAR) system for a vehicle. The LIDAR system may be used in at least one of: automatic emergency braking for the vehicle, forward sensing for the vehicle, or automated driving for the vehicle.

Any two or more of the features described in this specification, including in this summary section, may be combined to form implementations not specifically described in this specification.

The systems, techniques, components, structures, and variations thereof described herein, or portions thereof, can be implemented using, or controlled by, a computer program product that includes instructions that are stored on one or more non-transitory machine-readable storage media, and that are executable on one or more processing devices to execute at least some of the operations described herein. The systems, techniques, components, structures, and variations thereof described herein, or portions thereof, can be implemented as an apparatus, method, or electronic system that can include one or more processing devices and computer memory to store executable instructions to implement various operations. The systems, techniques, components, structures, and variations thereof described herein may be configured, for example, through design, construction, size, shape, arrangement, placement, programming, operation, activation, deactivation, and/or control.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

Described herein are example implementations of systems that use separate optical elements ("optics") for transmitting and receiving sensor signals. A type of sensor that may be used includes, for example, a light detection and ranging (LIDAR) system to detect one or more objects exterior to the vehicle. LIDAR is a technique for determining ranges (e.g., variable distance) by targeting an object with a laser and measuring the time for the reflected light to return to the receiver.

In the example systems described herein, the LIDAR system is integrated into headlight optics, which are different and separate from the LIDAR emitter optics. More specifically, an infrared emitter outputs infrared light, such as an infrared laser beam, towards a target, such as an object in the vehicle's path. The incident infrared light is reflected from the object back to optics in the vehicle's headlight. The optics in the vehicle's headlight direct the reflected infrared light to a detector. The detector receives the reflected infrared light and is responsive to the reflected infrared light to determine the presence, location, size, and/or other features of the object.

Using optics in the vehicle's headlight to receive and to direct the reflected infrared light may be advantageous. For example, optics needed to receive reflected infrared light accurately are usually of a greater size than that required to emit or to transmit the infrared light. By using existing optics in the headlight, which is larger than the optics in the infrared emitter, the amount of optics on the vehicle can be reduced. That is, there is no need for large, separate sensor optics to receive the reflected infrared light, since pre-existing, large optics in the headlight performs that function. Moreover, the large optics in the vehicle's headlight may improve the quality of the signal that reaches the detector, thereby providing more accurate detection results.

Another potential advantage of the example systems described herein is that existing headlight cleaning mechanisms can be used to clean the larger headlight optics used in the LIDAR system. Because there is no large, separate sensor optics to receive the reflected infrared light, there is likewise no need for separate cleaning mechanisms or additional cleaning solution for such sensor optics.

Figure 1:
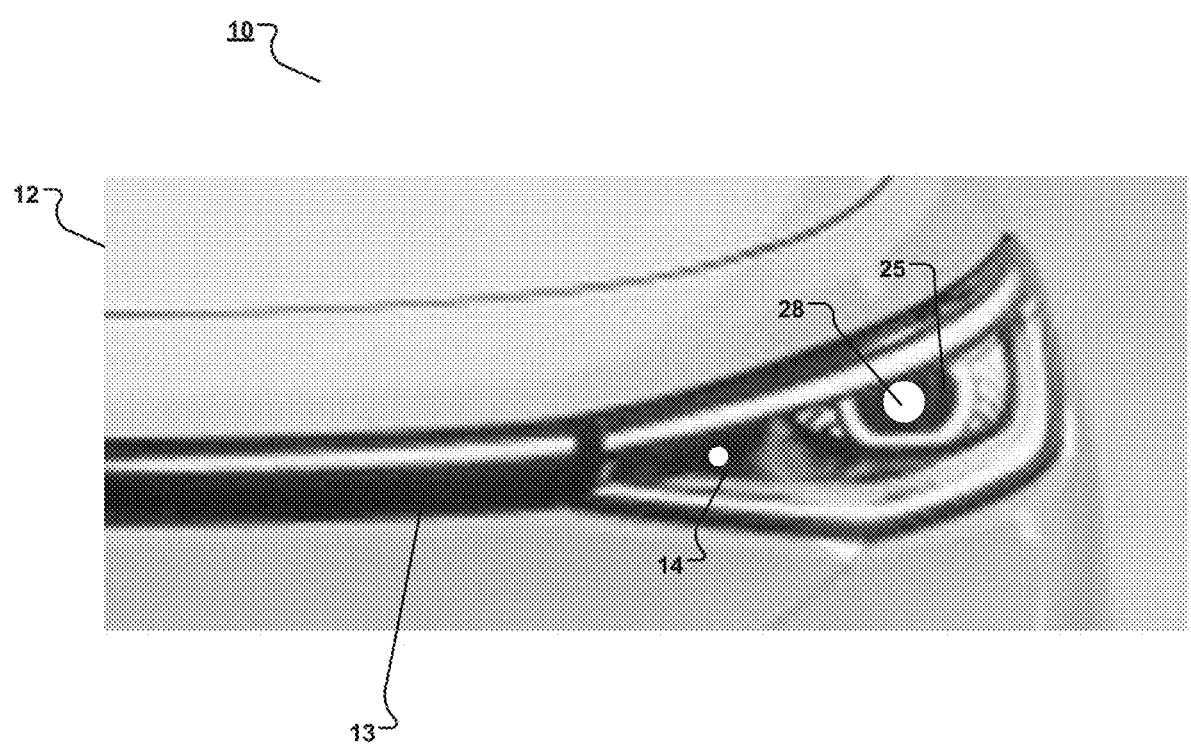
FIG. 1 is a diagram showing part of a front end of an automobile.

FIG. 1 shows components of an example system 10 of the preceding type that integrates sensor optics into an existing headlight system. As shown in FIG. 1, system 10 is part of an automobile 12 and, in particular, the front-end 13 of the automobile.

The system's components include an infrared emitter 14 to output infrared light towards a target. The infrared light may be a laser beam having wavelengths in the range of about 700 nanometers (nm) to 1 millimeter (mm). In some implementations, the infrared light is near infrared light (NIR), although the system is not limited as such. NIR light is generally considered to be in the range of 700 nm to 2500 nm. In a particular example, the infrared light has a wavelength of about 940 nm. In some implementations, the infrared light is shortwave infrared light (SWIR). SWIR light is generally considered to be in a range of wavelengths from 0.9 to 1.7 microns.

Figure 2:
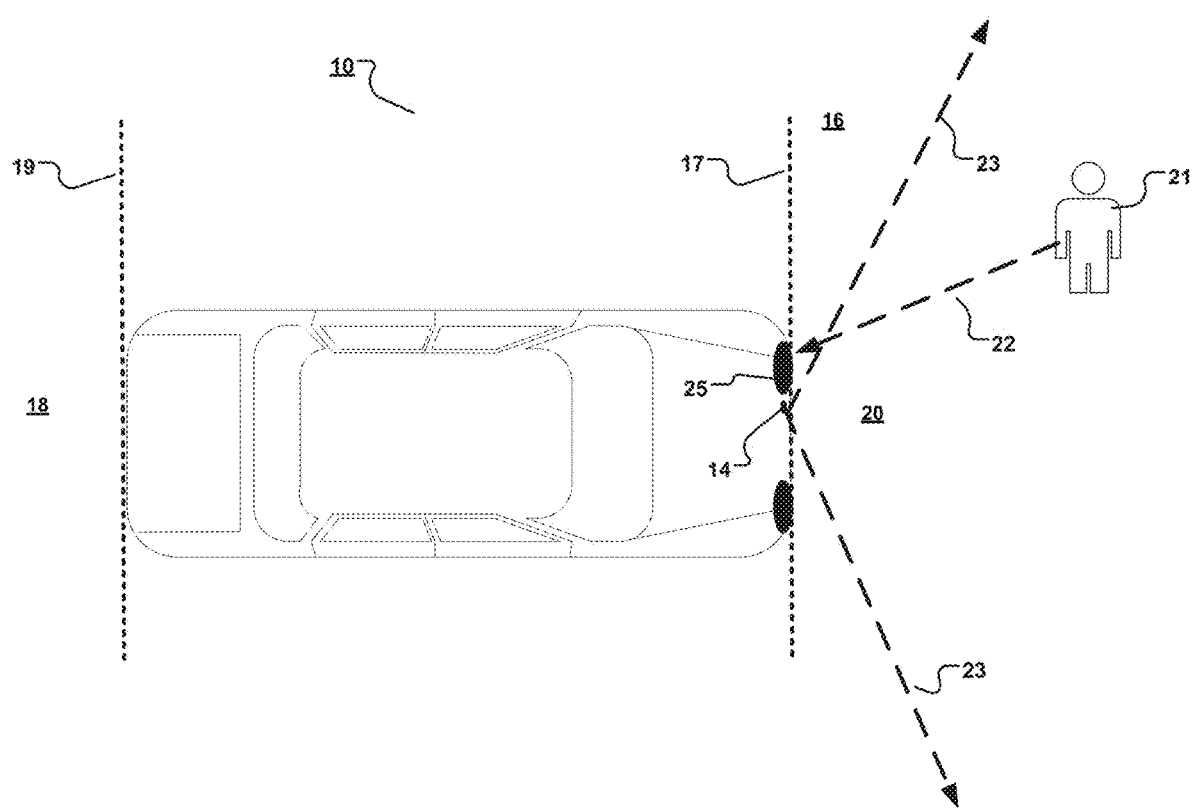
FIG. 2 is a top view of the automobile of FIG. 1.

Infrared emitter 14 may include an array of VCSELS (vertical-cavity surface-emitting laser) (for example, 1×8) that are individually addressable and may be fired in sequence to scan a field-of-view (FOV) in the front of the automobile. As shown in FIG. 2, "the front" of automobile 10 is not limited to directly in front, but rather includes any area 16 that is in front of a line 17 parallel to the automobile's front end. Likewise, "the back" of the automobile is not limited to directly in back, but rather includes any area 18 that is in back of a line 19 parallel to the vehicle's back end.

Infrared emitter 14 may be a relatively small device having a dimension of less than 0.5 mm or a larger device having a dimension of greater than 0.5 mm. The dimension may be, for example, a side of the device or a diameter of the device. During operation of the emitter, the infrared light may be moved side-to-side or up-and-down—in other words, scanned—in a plane by addressing the VCSELS in the array in linear sequence. As shown in FIG. 2, infrared light 23 from infrared emitter 14 may be scanned in a region, such as a plane 20, in front of automobile 10. The scanned infrared light may be pulsed, FMCW (frequency-modulated continuous wave) amplitude modulated, or pseudo-random pulse coded. In some implementations, an emitter may be used that emits laser light other than infrared light for LIDAR scanning.

The infrared light incident on an object 21 (in this example, a person) is reflected off of the object. The resulting reflected infrared light 22 propagates through the air back to automobile 10. All or at least some of that reflected infrared light is incident on headlight 25 (FIGS. 1 and 2). The optics—e.g., one or more optical elements, such as lenses and/or mirrors—in the headlight are configured to affect the direction and/or shape of the reflected infrared light such that the reflected infrared light is incident on a detector. The detector, which is described below, is part of the LIDAR system and is configured to detect the reflected infrared light and to generate an output, such as a signal, based on the reflected infrared light. The signal may be read by, or output to, an onboard control system, such as an onboard computing system, that interprets the signal along with other reflected infrared signals to determine the presence, location, size, or other features of the object that reflected the infrared light.

Figure 3:
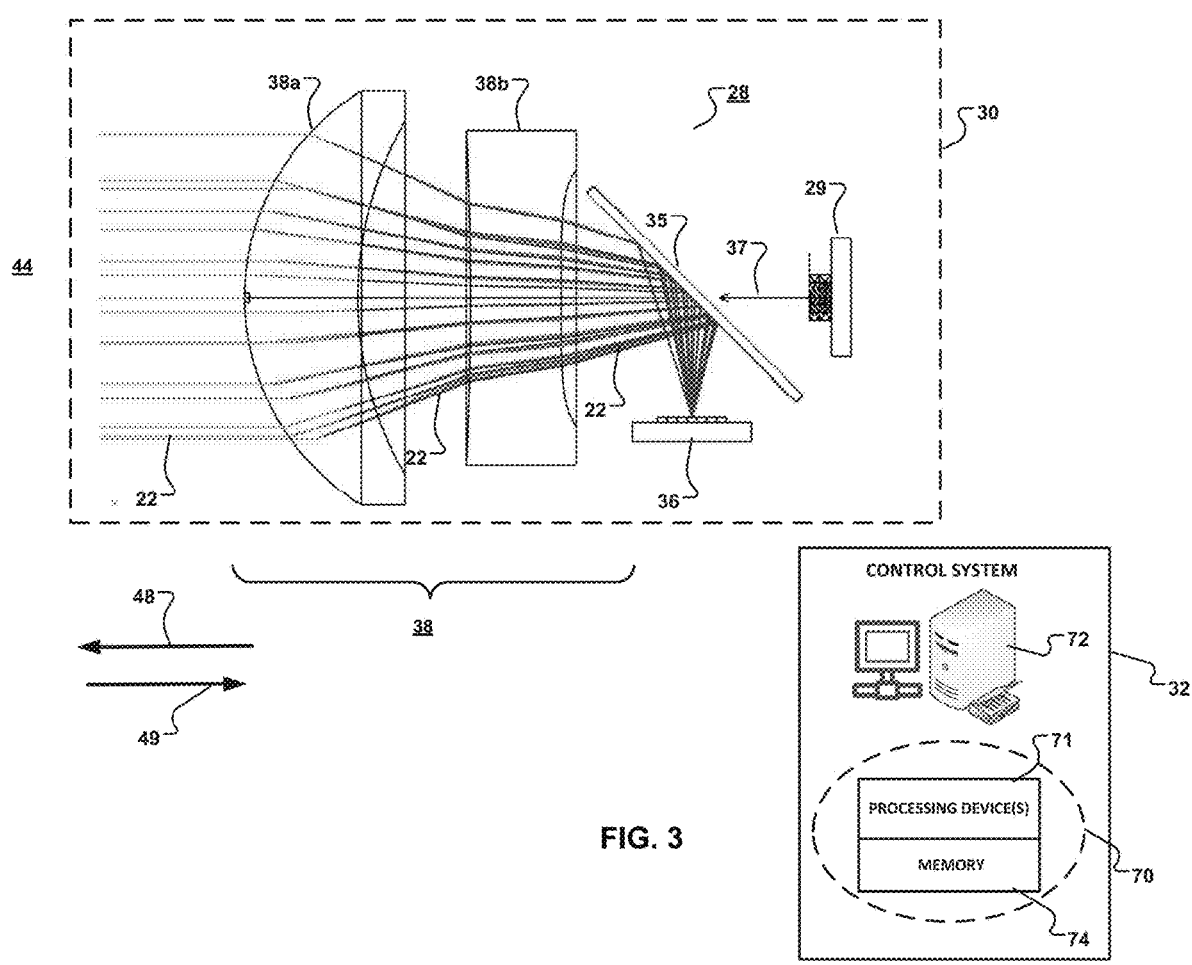
FIG. 3 is a side view of a sensing system integrated into example headlight optics and a block diagram of a control system therefor.
Figure 4:
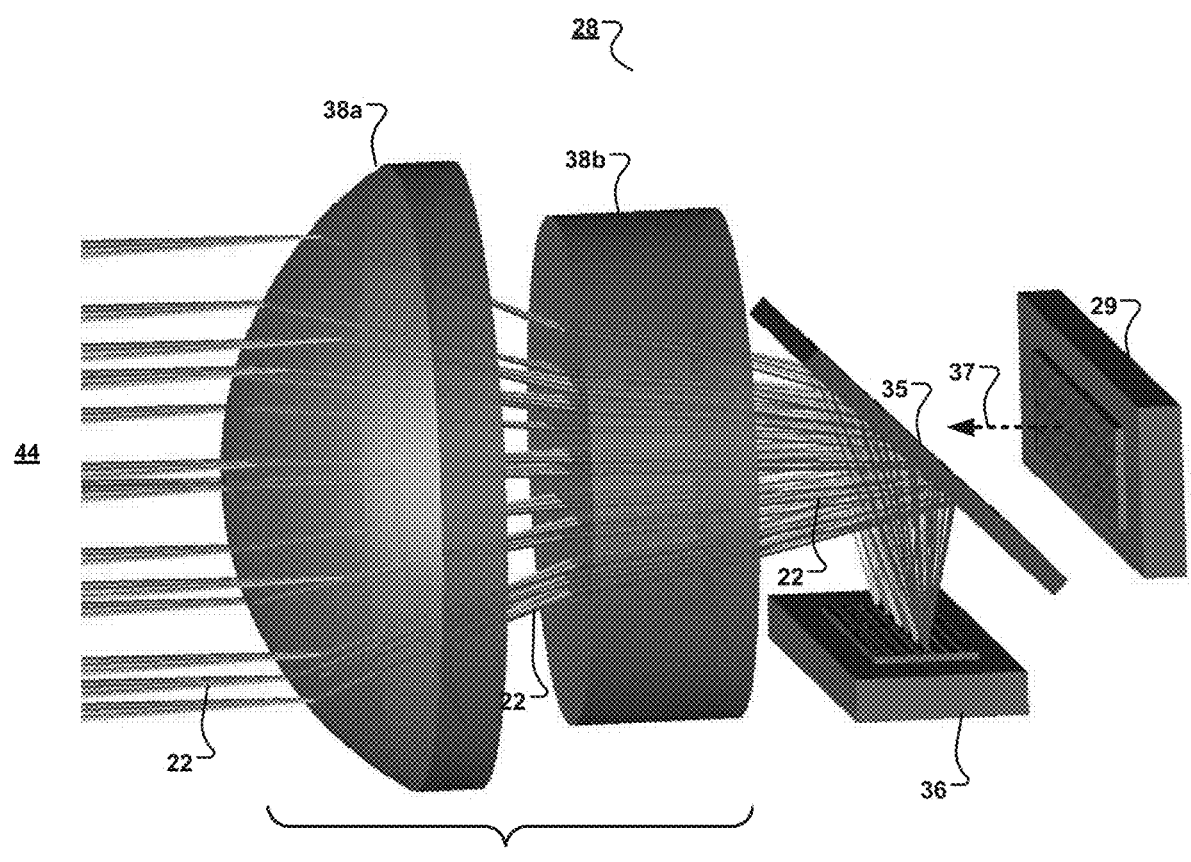
FIG. 4 is a perspective view of the system of FIG. 3.
Figure 5:
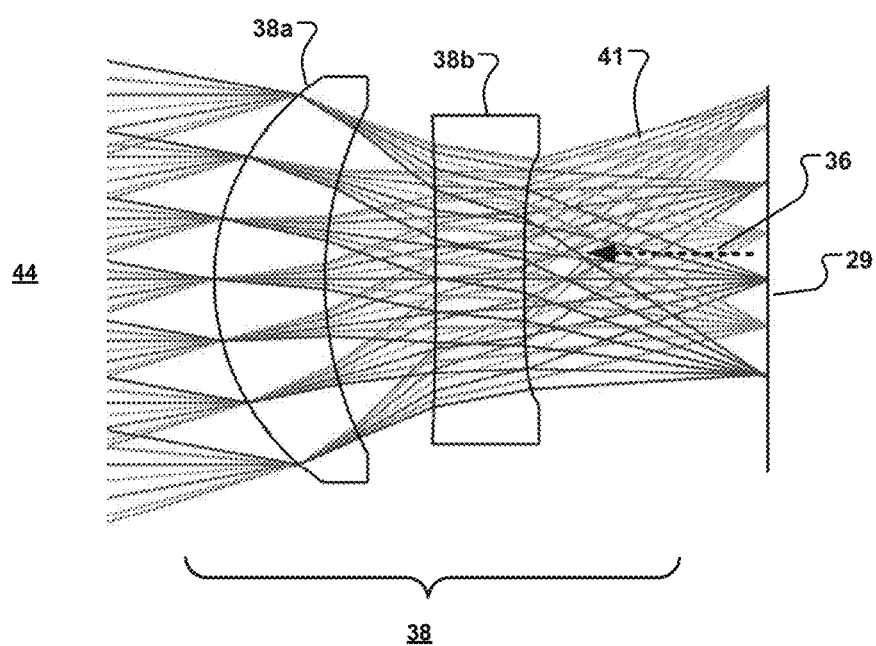
FIG. 5 is a side view of some components of the system of FIG. 3 showing an illumination path.

FIGS. 3 and 4 show components of a lighting system 28 included as part of a headlight 25 in automobile 10. Also, FIG. 1 shows where the components of lighting system 28 are located and FIG. 5 shows a subset of those components and the illumination path. The components may be held in, and mounted to, an enclosure 30 that contains the headlight and its various parts, as shown in FIG. 3. The components include a light emitter 29, such as a flat light emitting diode (LED) array, comprised of a matrix of collocated individual LEDs that are configured to emit white (visible) light. Use of an LED array may be advantageous because it eliminates or reduces the need for light guides in the headlight system.

The light emitted from the LED array may be visible light having wavelengths within in a range of about 400 nanometers (nm) to about 700 nm. Light having any wavelength in this range may be emitted. The light from the LED array is the light that is output from the headlight to illuminate a field in front of the automobile. The optics—e.g., lenses and/or mirrors—in the headlight are configured to affect the direction and/or shape of the visible light output to the environment.

The headlight may be controllable by the operator and/or a control system 32, which is described below with respect to FIG. 3, to operate in different modes such as low-beam operation and high-beam operations. During low-beam operation, the visible light from the headlight is typically on the order of 700 lumens. During high-beam operation, the visible light from the headlight is typically on the order of 1200 lumens. Regulations may specify headlight intensity in terms of candela (cd), where the range may be from 1200 cd for daytime running lights to 75,000 cd for high-beam operation. In any case, different vehicles may produce different light intensities for different modes of operation. In some implementations, during normal headlight operation, the direction of the output light is controllable; that is, the output light can be output in specified directions. For example, the LED array and/or optics may be controlled to move or to tilt in order direct the light output at specific angles based on signals received from the control system. In some implementations, during normal headlight operation, the direction of the output light is not controllable.

Components of system 28 also include a dichroic mirror (or simply "mirror") 35. Mirror 35 is dichroic in the sense that it allows light of certain wavelengths to pass through the mirror unimpeded and reflects light of other wavelengths. In this example, mirror 35 is coated with a thin film that allows visible light to pass unimpeded while reflecting infrared light. A mirror of this type is known as a "hot mirror".

In the example configuration of FIGS. 3 and 4, mirror 35 is angled at about 45° relative to detector 36 and LED array 29. In other implementations the angle may be different; for example, the mirror may be angled at 25°, 35°, 65°, 75° and so forth, depending on the locations and angular position of detector 36 and LED array 29. Light from LED array 29 passes in the direction of arrow 37 and proceeds through mirror 35 unimpeded on to optics 38, which is described below, and, thereafter, out of the headlight. This light 41 is shown in FIG. 5. By contrast, as shown in FIGS. 3 and 4, reflected infrared light 22, which entered the headlight from the environment and passed through optics 39, reflects off mirror, 31 in this example at a 45° angle, and onto a surface of detector 36. The reflected infrared light used in the LIDAR system may enter headlight 25 when LED array 29 is activated (for example, while the headlight is in low-beam or high-beam mode) or when LED array 29 is not activated (for example, while the headlight is off). Mirror reflects the reflected infrared light in the same way regardless of the illumination of LED array 29. Accordingly, the LIDAR system described herein works the same way regardless of the illumination of LED array 29.

In some implementations, detector 36 is or includes a flat silicon photomultiplier (SiPM) detector having cells that are responsive to infrared wavelengths of light, such as 940 nm or whatever wavelength is output by the infrared emitter. The cells are addressable in sequence by reflected infrared light resulting from infrared light scanned across a FOV in front of the automobile. In some implementations, the cells of the detector react to incident infrared light 22, for example, by illuminating and/or generating signals based on the infrared light. In implementations that use laser light other than infrared light, detector 36 may be responsive to laser light other than infrared light.

In some implementations, control system 32 may synchronously sample the detector output using rolling shutter readout in order to identify where the reflected infrared impacted the detector. A relatively low duty factor may be used to maximize SNR (signal-to-noise) ratio. The control system uses the information obtained from the detector to determine the presence, location, size, and/or other features of the object from which the reflected infrared light was received. Multiple reflections—for example, from scanning of the incident infrared light—may be required for the controller to make a determination about the presence, location, size, and/or other features of the object.

Signals obtained via the LIDAR system may be used by the control system to control and/or to inform various automobile operations including, but not limited to, automatic emergency braking for the automobile, forward sensing for the automobile, or automated/self-driving for the automobile. For example, if an object is detected in the automobile's path of travel, the vehicles brakes may be activated, or the steering of the automobile may be controlled to avoid the object, as described below.

In this example, optics 38 also include two lenses 38a, 38b; however, more than two or fewer than two lenses may be used. For example, one lens may be used or three, four, five or more lenses may be used. In this example, the two lenses are aspherical and include a convex lens 38b and a concave-convex lens 38a. As shown in FIG. 5, in this optics configuration, white (visible) light 41 from LED array 29 passes through mirror 35 (not shown in FIG. 5) unimpeded and, thereafter, through lenses 38a, 38b in the manner shown to illuminate the environment 44 in front of the automobile. By contrast, referring to FIGS. 3 and 4, reflected infrared light 22 enters headlight 25 and optics 38 as shown. Lens 38a directs reflected infrared light 22 onto lens 38b, and lens 38b directs reflected infrared light 22 onto mirror 35. In an example, the lens system in its entirety focuses such that the incoming infrared light is focused when it reaches detector 36. Mirror 35 reflects reflected infrared light 22 onto detector 36, which reacts to the reflected infrared light as described above.

Stated otherwise, in a first direction 48 (FIG. 3) of the optical path containing lenses 38a, 38b, lenses 38a, 38b direct visible light 41 away from the LED array 29 and at least partially disperse the visible light into the environment 44 external to the automobile. In a second direction of that same optical path 49, lenses 38a, 38b direct the reflected infrared light 22 onto mirror 35, which reflects that light onto detector 36.

In some implementations, an example lens 38a has a 13 mm aperture entrance, which is more than ten times the dimension of an example infrared emitter having a side or a diameter of 0.5 mm. This dichotomy between the size of the infrared emitter 14 and the size of the headlight's lens 38a enables the LIDAR operation and advantages described above. The dimensions described herein, however, are only examples. In some implementations, the entrance to the headlight optics may be twice the dimension of the infrared emitter, five times the dimension of the infrared emitter, fifteen times the dimension of an infrared emitter, twenty times the dimension of the infrared emitter, and so forth, or any appropriate value in between these.

Figure 6:
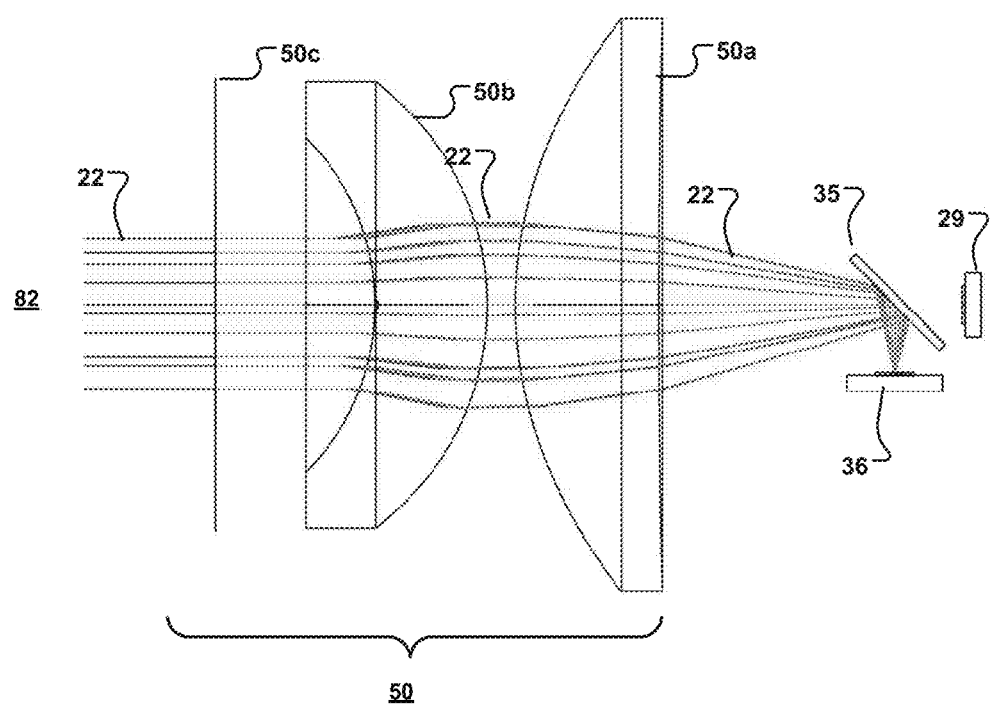
FIG. 6 is a side view of an alternative example of a sensing system integrated into example headlight optics.
Figure 7:
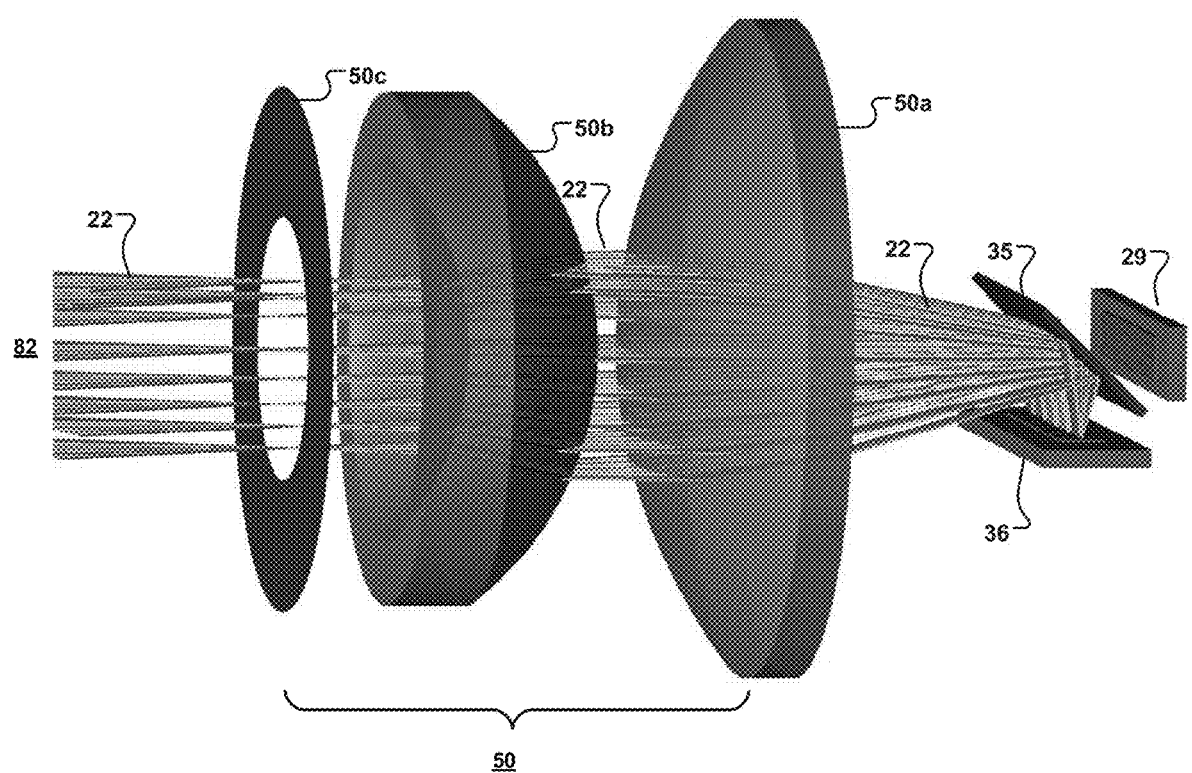
FIG. 7 is a perspective view of the system of FIG. 6.
Figure 8:
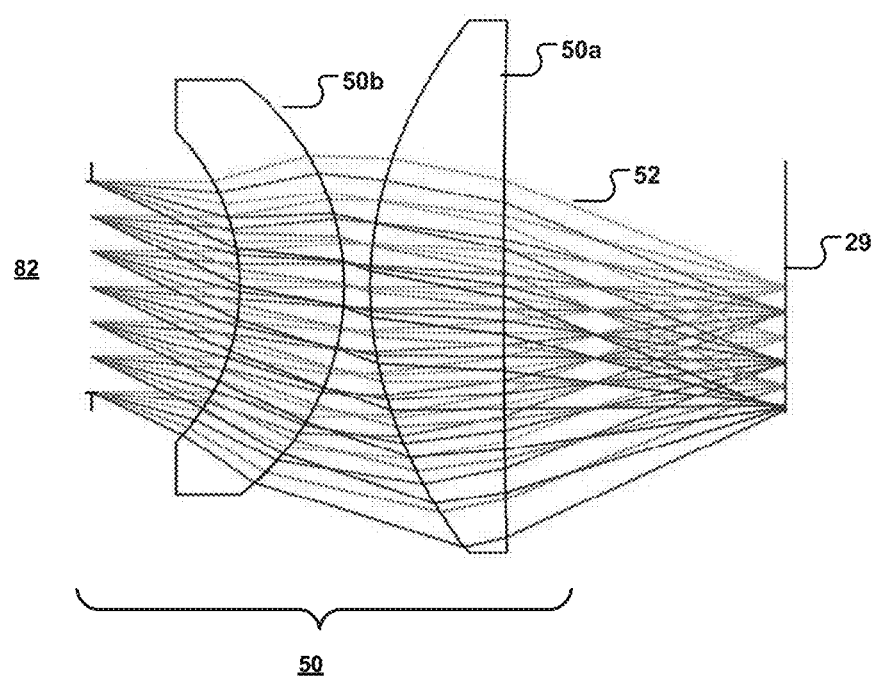
FIG. 8 is a side view of some components of the system of FIG. 6 showing an illumination path.

In some implementations, example optics 50 of FIGS. 6 to 8 may be substituted for the optics of FIG. 38 in the systems described herein. Optics 50 includes an aspherical lens 50a having one side that is flat and one side that is concave. Optics 50 also includes a concave-convex lens 50b and a telecentric stop having aperture of 14 mm in this example (although larger or smaller apertures may be used). Telecentric stop 50c (not shown in FIG. 8) partially collimates light output from, or input to, the remainder of optics 50. FIG. 8 shows how optics 50 directs white (visible) light 53 output from LED array 29 to illuminate in front 82 of the automobile. FIGS. 6 and 7 show how optics 50 direct, and at least partially focus, reflected infrared light 22 onto detector 36. In this implementation, detector 36, LED array 31, and mirror 35 have the same structures and functions as the implementation described with respect to FIGS. 3 to 5.

Figure 9:
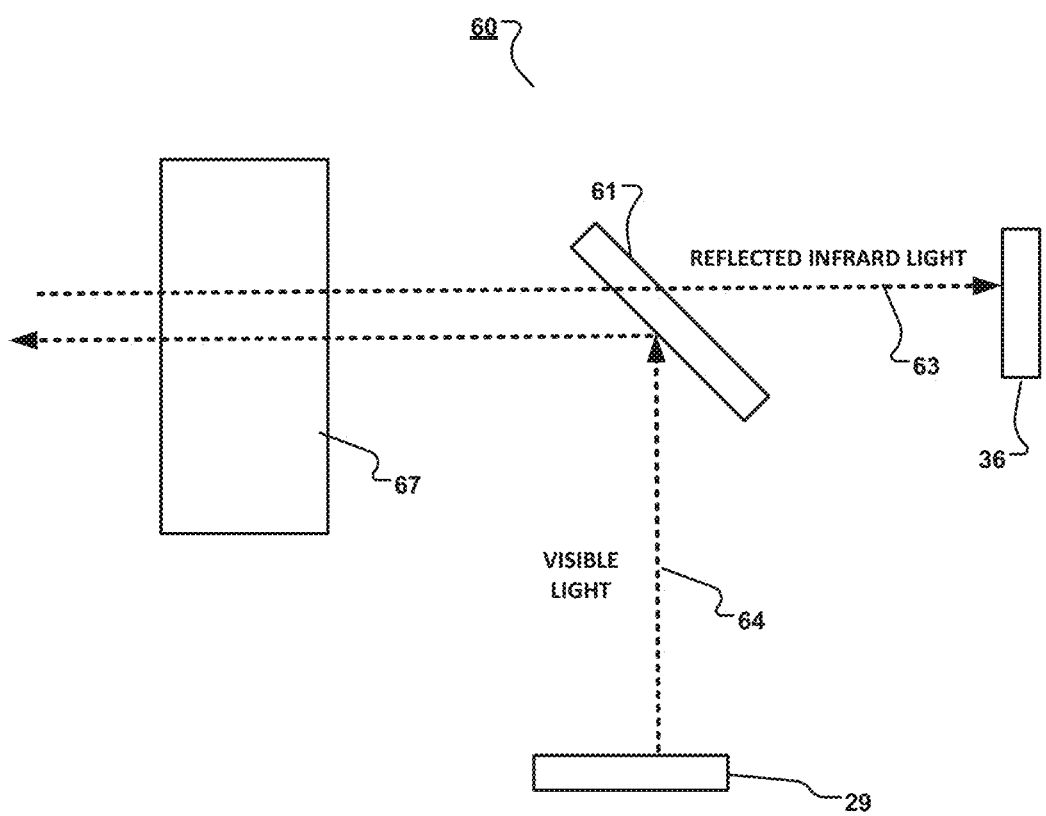
FIG. 9 is a side view of an alternative example of a sensing system integrated into example headlight optics.

FIG. 9 shows an alternative system 60 of the type described herein. In system 60, mirror 61 is coated with a thin film that allows infrared light 63 (e.g., the same as reflected infrared light 22) to pass through mirror 61 unimpeded and that reflects visible light 64. This type of dichroic mirror is known as a "cold mirror". Accordingly, in system 60, detector 36 may be positioned as shown to receive reflected infrared light 63 passing through mirror 61 and LED array 29 may be positioned as shown to provide the visible light 64 for the headlight that is reflected from mirror 61 and output to the environment. In the example configuration of FIG. 9, mirror 61 is angled at about 45° relative to detector 36 and LED array 29. In other implementations the angle may be different; for example, the mirror may be angled at 25°, 35°, 65°, 750 and so forth, depending on the locations and angular position of detector 36 and LED array 29, In system 60, optics 67 include a telecentric lens and can be implemented using two lens elements, with at least one having an aspherical surface. Any appropriate optical configuration may be used to receive and to direct both the visible light and the infrared light to the appropriate components, including those described with respect to FIGS. 3 to 8. A potential additional advantage of system 60 is that it may be compatible with a flat detector 36 without requiring lightguides.

The implementations of the LIDAR system described herein may have a FOV of approximately 50°×10° and may reliably detect 10% reflective objects at a 40 meter (me) distance in full sunlight. These numbers, however are examples only and are not limiting. For example, the range of the system can be increased by scaling the optics.

The example systems described herein, such as systems 10, 28, and 60, each may be controlled a control system, such as control system 32 of FIG. 3, to control all or part of the operation of the system components. The control system may be part of an onboard control system on the automobile. As shown in FIG. 3, in some implementations, an onboard portion 70 of control system 30 includes one or more processing devices 71 of the type described herein that are programmable to control operations of at least some of the components of the system. The onboard portion 70 of control system 30 may also include memory 74 for storing data and programs executable by the one or more processing devices 71 to implement all or part of the functionality described herein. The control system 32 may also include an external computing system 72 that communicates to the onboard control portion 70. For example, the external computing system 72 may communicate with the onboard control portion 70 using a cellular network or other appropriate wireless functionality.

Figure 10:
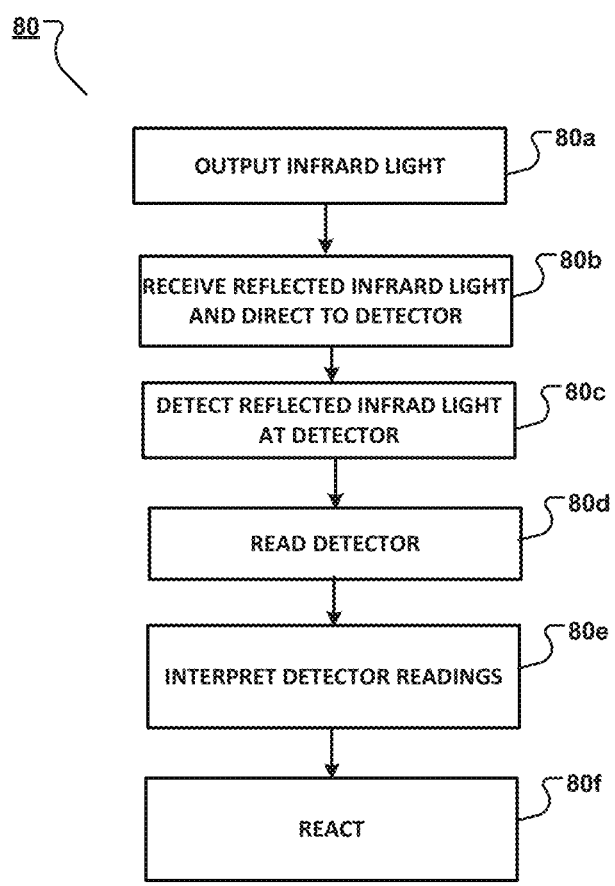
FIG. 10 is a flowchart showing a process for using a sensing system that incorporates headlight optics.

FIG. 10 shows operations that may be part of an example process 80 that may be performed using the example systems described herein, such as systems 10, 28, and 60. Process 10 includes controlling an infrared emitter to output (80a) infrared light to scan a region external to a vehicle, such as automobile 12. The infrared light reaches an object in the infrared emitter's scanning field (e.g., 20 of FIG. 2) and reflects from the object. All or part of the reflected infrared light is received (80b) at a vehicle's headlight, such as headlight 25. Optics included in systems 10, 28, and 60 direct the infrared light to a detector. The detector is responsive to the reflected infrared light to detect the reflected infrared light (80c). The detector is read (80d) by the control system as described herein and/or outputs one or more signals to the control system based on the detected infrared light. The control system interprets (80e) the readings/signals obtained from om the detector and reacts (80f) accordingly. For example, the control system may output a warning on a display screen on the interior of the cabin, output an audible warning, or take control of the vehicle whether or not an operator is otherwise controlling the vehicle. For example, the control system may control the automobile's brakes to stop or to slow-down before reaching the object or the control system may control the automobile's steering to avoid the object preemptively. Other controls not described herein also may be implemented.

Although the preceding descriptions focus on using LIDAR on a vehicle's front-end, LIDAR may be incorporated on the back-end of a vehicle to scan region 18 (FIG. 2) using to the techniques described herein, where the taillight optics are used as receiving optics for reflected infrared (or other wavelength) signals. Furthermore, the systems and techniques are not limited to use with automobiles, but rather may be used with any type of vehicle, whether operator-drive or automated. Still further, a LIDAR system of the type described herein may be implemented using more than one headlight or taillight. For example, each vehicle headlight or taillight may include LIDAR functionality of the type described herein. In some cases, a single infrared emitter may be serviced by headlight LIDAR functionality in two front-end headlights of the type described herein or each headlight LIDAR functionality may operate with a separate, dedicated infrared emitter. The same is true for taillight LIDAR configurations. Still further, the systems and techniques are not limited to use with vehicle lights, but rather may integrate any type of light source into a LIDAN system for use as receiving optics as described herein.

Furthermore, although the preceding descriptions focus on using LIDAR, other types of detectors may be used. For example, a line scan sensor may be used in place of LIDAR detector. In an example, a line scan sensor may be a camera that uses a single row of light-sensitive pixels that image across the object, line-by-line, using high intensity lighting. A completed image is constructed by combining the lines.

In an example system of this type, headlight optics, which are different and separate from line scan detector optics, are integrated into a line scan detection system. Similar to above, an emitter outputs light, such as scanning laser beam, towards a target, such as an object in the vehicle's path. The incident light is reflected from the object back to optics in the vehicle's headlight. The optics in the vehicle's headlight direct the reflected light to a line scan detector. The line detector receives the reflected infrared light and is responsive to the reflected light to generate signals used by the control system to determine the presence, location, size, and/or other features of the object using line scan technology.

All or part of the systems and processes described in this specification and their various modifications may be configured or controlled at least in part by one or more computing systems, such as control system 32, using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with configuring or controlling the systems and processes described herein can be performed by one or more programmable processors executing one or more computer programs to control or to perform all or some of the operations described herein. All or part of the systems and processes can be configured or controlled by special purpose logic circuitry, such as, an FPGA (field programmable gate array) and/or an ASIC (application-specific integrated circuit) or embedded microprocessor(s) localized to the instrument hardware.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A system comprising:
    an infrared emitter to output infrared light towards a target, the infrared light reflecting from the target to produce reflected infrared light;
    a detector to receive the reflected infrared light and to provide a signal based on the reflected infrared light; and
    a lighting system comprising:
        a light emitter to output visible light;
        a mirror configured (i) to allow the visible light to pass through the mirror and to reflect the reflected infrared light onto the detector, or (ii) to allow the reflected infrared light to pass through the mirror and onto the detector and to reflect the visible light; and
        one or more optical elements configured to affect the visible light and the reflected infrared light, the mirror being between the light emitter and the one or more optical elements or the mirror being between the detector and the one or more optical elements.

2. The system of claim 1, wherein the lighting system comprises a headlight of a vehicle.

3. The system of claim 1, wherein the detector comprises a silicon photomultiplier (SiPM) sensor that is responsive to infrared wavelengths of light.

4. The system of claim 1, wherein the infrared emitter comprises a near infrared (NIR) laser emitter and the infrared light comprises laser light.

5. The system of claim 1, wherein the mirror comprises a dielectric mirror comprising a dichroic filter to allow the visible light to pass and to reflect the infrared light.

6. The system of claim 1, wherein the infrared emitter and the detector comprise components of a light detection and ranging (LIDAR) system for a vehicle.

7. The system of claim 6, wherein the system is part of a vehicle; and
    wherein the LIDAR system is configured for use in at least one of: automatic emergency braking for the vehicle, forward sensing for the vehicle, or automated driving for the vehicle.

8. The system of claim 1, wherein, along a first direction of an optical path containing the one or more optical elements, the one or more optical elements direct the visible light away from the light emitter; and
    wherein, along a second direction of the optical path, the one or more optical elements direct the reflected infrared light towards the mirror.

9. The system of claim 8, wherein, along the first direction of the optical path, the one or more optical elements direct the visible light; and
    wherein, along the second direction of the optical path, the one or more optical elements at least partially focus the reflected infrared light.

10. The system of claim 1, wherein, in at least one dimension, at least one of the optical elements has a dimension that is at least ten times greater in size than a dimension of optics in the infrared emitter.

11. The system of claim 1, wherein the detector comprises cells that are addressable for operation; and
    wherein the cells are addressable in sequence by the reflected infrared light to produce a scan of a field of view in front of the infrared emitter.

12. The system of claim 1, wherein the one or more optical elements comprise at least one convex lens.

13. The system of claim 1, wherein the one or more optical elements comprise at least one concave-convex lens.

14. The system of claim 1, wherein the one or more optical elements comprise at least one telecentric stop.

15. The system of claim 1, wherein the light emitter comprises a light-emitting diode matrix array configured to project the visible light toward the mirror.

16. A method of scanning a target, the method comprising:
outputting infrared light toward the target;
receiving reflected infrared light from the target via first optics that are also configured to output visible light toward the target, the first optics being physically separate from second optics used to output the infrared light toward the target;
directing, via the first optics, the reflected infrared light toward a dielectric mirror comprising a dichroic filter configured (i) to reflect infrared light and to allow the visible light to pass through the dielectric mirror, or (ii) to reflect the visible light and to allow the infrared light to pass through the dielectric mirror; and
receiving, at a detector, the reflected infrared light via the dielectric mirror, the detector providing one or more signals based on the reflected infrared light.

17. The method of claim 16, wherein, along a first direction of an optical path containing the optics, the optics directs the visible light away from a light emitter; and
wherein, along a second direction of the optical path, the optics directs the reflected infrared light towards the dielectric mirror.

18. The method of claim 17, wherein, along the first direction of the optical path, the optics direct the visible light; and
wherein, along the second direction of the optical path, the optics at least partially focus the reflected infrared light.

19. The method of claim 16, wherein, in at least one dimension, the first optics are at least ten times greater in size than the second optics.

20. The method of claim 16, which is performed by a light detection and ranging (LIDAR) system for a vehicle;
wherein the LIDAR system is used in at least one of: automatic emergency braking for the vehicle, forward sensing for the vehicle, or automated driving for the vehicle.

* * * * *